Aug. 17, 1937.  W. A. RIDDELL  2,090,070
PHOTOGRAPHIC SHUTTER WITH BUILT-IN SHUTTER ACTUATOR
Filed May 12, 1936
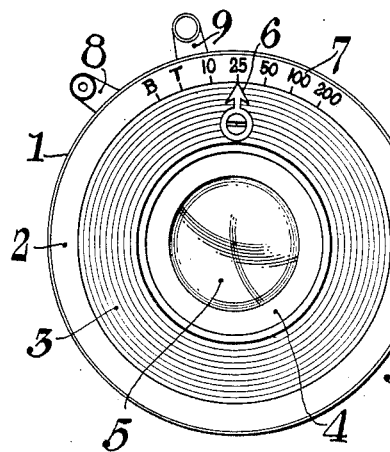
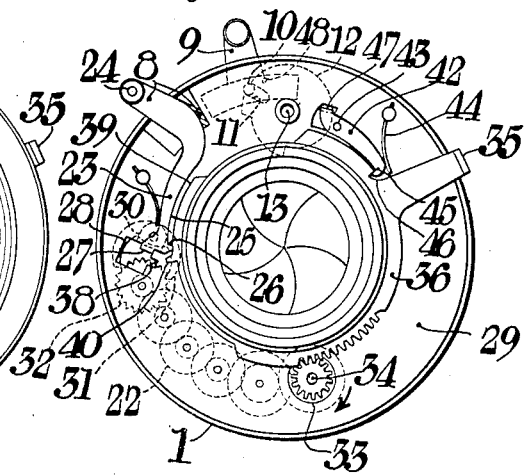
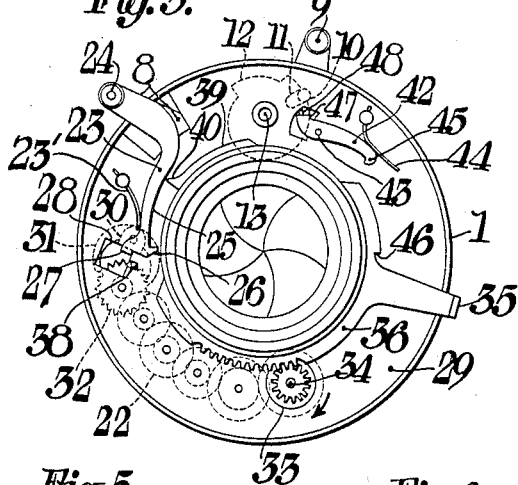
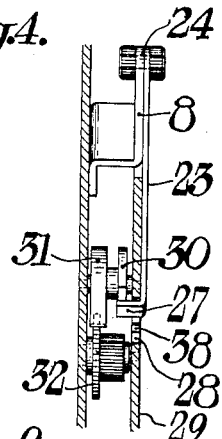
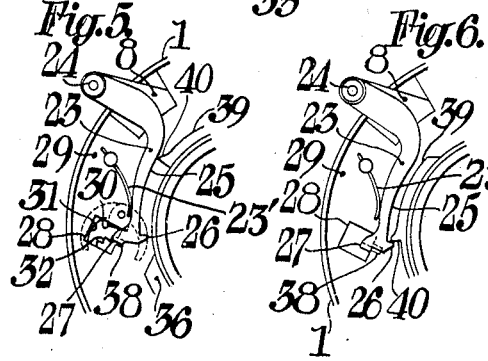
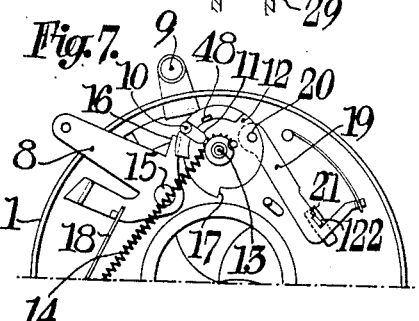
William A. Riddell,
INVENTOR
BY
ATTORNEYS.

Patented Aug. 17, 1937

2,090,070

UNITED STATES PATENT OFFICE 2,090,070

PHOTOGRAPHIC SHUTTER WITH BUILT-IN SHUTTER ACTUATOR

William A. Riddell, Rochester, N. Y., assignor, by mesne assignments, to Eastman Kodak Company, Jersey City, N. J., a corporation of New Jersey Application May 12, 1936, Serial No. 79,342

12 Claims. (Cl. 161—26)

This invention relates to photography and more particularly to photographic shutters. One object of my invention is to provide a shutter with a built-in shutter actuator, so that the shutter mechanism can be made to function after a period of time has elapsed. Another object of my invention is to provide a shutter in which the shutter trigger is used in the normal manner for making an ordinary exposure, and in which the shutter trigger is used also for initiating the start of the shutter actuating mechanism. Another object of my invention is to provide a trigger with a lever which may be guided through a normal path for making normal exposures, and which may be guided into an abnormal path for making delayed action exposures. Another object of my invention is to provide a shutter of the setting type in which it is impossible to set the shutter actuating mechanism unless the shutter has first been set. Another object of my invention is to provide a setting shutter with a latch member which will normally hold the shutter actuating mechanism in its inoperative position, and which latch will be automatically released upon placing the shutter master member under tension. Still another object of my invention is to provide a shutter actuating mechanism and a shutter operating mechanism both interconnected with the shutter trigger, so that the same trigger may be used for making the usual type of exposures or delayed action exposures, and other objects will appear from the following specification, the novel features being particularly pointed out in the claims at the end thereof.

There are a number of known types of shutter in which there is enclosed in a single shutter casing, mechanism for making the usual instantaneous and delayed time exposures, and in which there is also mounted mechanism for delaying the start of such exposures. Such shutter actuators are primarily used where the operator desires to get into the picture himself and starts the shutter actuating mechanism working, knowing that it will cause the shutter mechanism to function after a predetermined period of time.

It is desirable with such shutters, particularly where the shutters are of the setting type in which a master member must be tensioned before the shutter can be released, to provide some means for preventing the shutter actuating mechanism from being set unless the shutter is set, because it may well happen that movement of the shutter actuating mechanism will make much the same sound as the shutter mechanism, and consequently might operate when the shutter master member is not set, so that no exposure would be made. It is also desirable to provide a shutter with a single trigger which can be utilized for making any of the desired types of exposures.

Coming now to the drawing wherein like reference characters denote like parts throughout:

Fig. 1 is a front plan view of a shutter constructed in accordance with and embodying a preferred form of my invention.

Fig. 2 is a plan view of the shutter shown in Fig. 1, but with the shutter cover and time adjusting cam removed.

Fig. 3 is a view similar to Fig. 2 but with the shutter actuating mechanism in a set position.

Fig. 4 is a fragmentary detail sectional view, parts being shown in elevation, of the connecting lever between the shutter trigger and the shutter actuating mechanism pallet.

Fig. 5 is a fragmentary detail showing the position of the shutter trigger and lever when the shutter is being actuated by the shutter actuator.

Fig. 6 is a view similar to Fig. 5 but with the shutter actuating mechanism starting to pull down upon the trigger to make an exposure.

Fig. 7 is a fragmentary plan view of portions of the shutter actuating mechanism, including the master member and blade ring operating latch.

In the preferred embodiment of my invention shown in the accompanying drawing, I have shown the shutter mechanism to be the same as that shown in my copending application Serial No. 75,155, filed April 18, 1936, and reference may be had to this application for a more detailed description of the shutter operating mechanism and the means for making delayed exposures.

In the present embodiment the shutter may consist of a casing 1 on which there is revolubly mounted a time cam 2 and a shutter cover 3. The shutter cover may support a cell 4 which holds the front element 5 of an objective. An arrow 6 on the shutter cover is provided for pointing to the various time indicating marks on the scale 7.

The shutter may have a trigger 8 which is used for making the exposure and is preferably provided with a setting lever 9 which may slide on the shutter casing to cause the pin 10 to move through the slot 11 in the master member 12 to turn it about its pivot 13 and to tension an operating spring 14, best shown in Fig. 7.

The trigger 8 is pivoted upon a stud 15 and is provided with a latch member 16 which is adapted to engage and hold the master member 12 in a set position. When in such position, member 16 engages the latching surface 17 on the master member. By depressing the trigger which is held by a spring 18 in its uppermost position, part 17 may be released, permitting the master member, through the crank 19 pivoted at 20, to swing the hook 21 and with it the blade ring lug 122 rapidly back and forth to make an exposure. As thus far described, the mechanism is known, being shown in my copending application, and certain of the features being also shown in other shutters of the prior art.

As explained in my copending application, exposures of varying duration from a tenth to a two-hundredth of a second can be made by employing a gear train for making the retarded exposures. Since this forms no part of my present invention, the gear train has been omitted from the present showing.

Coming now to my invention, to the trigger 8 I attach a trigger lever 23, this lever being pivoted upon a stud 24 carried by the trigger and being provided with a cam surface 25. A spring 23' tends to press the lever 23 toward the hook member 40. On the end of the cam surface there is a hook 26 and a lug 27, which, as best shown in Fig. 4, extends downwardly through an opening 28 in the annular plate 29 into the path of a plate 30 which is mounted upon and carried with a pallet 31 forming a part of the gear train 32. The gear train 32 comprises a series of gears connected to a drum 33 which contains a spring coiled about the shaft 34, this spring being adapted to normally turn shaft 34 in the direction shown by the arrow. In order to store up energy in this spring, it must be set by moving a setting lever 35 in a clockwise direction, with reference to the drawing from the position shown in Fig. 2 to the position shown in Fig. 3.

In other words, in Fig. 3 energy has been stored in the spring, and if the trigger 8 should be depressed, the lug 27, by moving away from a flat surface on the plate 30, would permit the pallet to oscillate and the spring to drive the gear train and the ring 36, carrying the setting lever 35, in a counterclockwise direction. Thus, it will be seen that the shutter operating mechanism may be released by depressing the trigger. However, when the trigger is depressed with the parts in the position shown in Fig. 3, the lug 27 will drop into a notch 38 in the opening 28 and prevent the trigger from being depressed so as to move through its usual range of movement. As soon as the trigger comes to a stop, an operator naturally releases the trigger, but the movement of the ring 36 continues, gear train 32 having been released by the disengagement of lug 27 and plate 30.

The ring 36 is provided with a cam 39 terminating in a hook-like end 40. As the ring 36 moves in a counterclockwise direction, the hook 40 engages the cam surface 25 of the trigger lever 23, slowly swinging this lever upon its pivot 24 and gradually raising the lug 27 from the notch 38. Fig. 6 indicates this movement about completed, and as soon as the lug 27 is cammed completely out of the notch 38, further movement of the ring will cause the hook 40 to engage the hook 26 and slowly depress the trigger 8 still further. By continuing to draw down on the trigger 8, member 16, forming a part of the trigger, is moved from behind the shoulder 17 on the master member, permitting the usual exposure to be made. When the parts move just beyond the position shown in Fig. 6, and the hook 40 slips off of the hook 26, the trigger 8 may again return to its initial position as indicated in Fig. 2. By this time, the ring 36 has also returned to the position shown in Fig. 2, so that the cam 39 will now lie adjacent the trigger lever 23.

Thus, the parts are automatically positioned for normal exposures, that is to say, a pressure upon the trigger 8 would cause the trigger and the trigger lever to move through a normal path of movement, during which movement the lug 27 would move downwardly to substantially the end of the opening 28 without dropping in the slot 38, for the following reasons:

When the trigger is moved beyond the position shown in Fig. 2, the hook 26 may ride up over the hook 40 on the ring 36, and since these two parts would be engaged at the time the lug 27 reaches the notch 38, the notch would be ineffective and the trigger lever would slide through its normal path of movement.

In order to hold the shutter parts in position to make normal exposures, I prefer to provide a latch 42 pivotally mounted at 43 upon plate 29 and being pressed by a spring 44 so that the hook 45 will be pressed into engagement with a notch 46 in the ring 36. On the opposite end of lever 42, there is a downwardly projecting flange 47 which lies in the path of a lug 48 on the master member 12. Whenever the parts are in a position of rest, the ring 36 is latched. Consequently, if an operator should push down on the handle 35 in an attempt to set the shutter actuating mechanism, the ring 36 could not be moved. However, the operator needs only to move the shutter setting lever 9 from the position shown in Fig. 2 to that shown in Fig. 3 to release the latch 42. By swinging the master member 12 upon its pivot 13, the lug 48 is brought into contact with the flange 47, swinging lever 42 to the position shown in Fig. 3, in which the ring 36 is unlatched. When in this position, if a normal exposure is to be made, the trigger 8 is merely released, permitting the master member to actuate the shutter leaves in the usual manner.

If it is desired to have the shutter actuator operate the shutter with the shutter lever 9 in the set position shown in Fig. 3, the lever 35 may be pushed downwardly tensioning the spring which operates the gear train 22 and placing the parts in the position shown in Fig. 3. In this tensioning movement the pallet 31 and plate 30 do not oscillate because there is a one-way clutch of the usual type between one of the gears of the gear train and its driving spring. This clutch may be made like the clutch shown in my U. S. Patent 2,005,394, June 18, 1935.

The trigger lever 23, through the engagement of member 27 with the flat side of plate 30, holds the shutter actuating mechanism in a set position ready for an exposure.

To operate the shutter through the shutter operating mechanism, the trigger is depressed until the lug 27 engages the notch 38, as fully described above. This movement permits the gear train 22 to start to drive the ring 36 and to gradually bring the cam 40 in contact with the cam surface 25 so as to release the shutter lever and at the same time pull downwardly upon the shutter lever until the exposure is made.

With the mechanism described above, the shutter is relatively fool-proof, in that it is impossible for an operator to set and release the shutter actuating mechanism without first having set the shutter. The shutter actuating mechanism is normally latched against movement in its inoperative position, and consequently the shutter is always positioned for normal operation. The shutter actuating mechanism is only momentarily released, this release occurring when the master member is set and existing only so long as the master member is set and not released. By providing a shutter and a pivoted shutter lever as above described, pressure upon the shutter always causes an exposure regardless of what type of exposure is to be made.

While I have described a preferred embodiment of my invention, certain features are obviously applicable to various different types of shutter mechanism, and I consider as within the scope of my invention all such forms as may come within the scope of the appended claims.

What I claim as my invention and desire to be secured by Letters Patent of the United States is:

1. In a photographic shutter, the combination with shutter mechanism including a master member, shutter blades, operable connections between the blades and master member, a trigger for releasing the master member to make an exposure, a lever attached to the trigger forming a first latch element, a second latch element carried by the shutter, and means carried by the shutter for guiding the lever through a path of movement in which the two latch elements may be engaged, a manually settable member, a second guide carried thereby, a hook carried by the settable member, a motor for moving the settable member, the manually settable member having a normal position of rest in which said second guide is adapted to hold the trigger lever out of contact with the shutter guide and latch whereby an exposure may be made by manually depressing the trigger.

2. In a photographic shutter, the combination with shutter mechanism including a master member, shutter blades, operable connections between the blades and master member, a trigger for releasing the master member to make an exposure, a lever attached to the trigger forming a first latch element, a second latch element carried by the shutter, and means carried by the shutter for guiding the lever through a path of movement in which the two latch elements may be engaged, a manually settable member, a second guide carried thereby, a hook carried by the settable member, a motor for moving the settable member, the manually settable member having a normal position of rest in which said second guide is adapted to hold the trigger lever out of contact with the shutter guide and latch whereby an exposure may be made by manually depressing the trigger, said settable member having a second operative position from which it moves under the impulse of said motor, the second guide, when moved to the second position, being moved to permit the trigger and shutter latches to cooperate, and means including said hook for unlatching and moving the trigger arm as said settable means moves to actuate the trigger through said trigger arm.

3. In a photographic shutter, the combination with shutter mechanism including a master member, shutter blades, operable connections between the blades and master member, a trigger for releasing the master member to make an exposure, a lever attached to the trigger forming a first latch element, a notched guiding rail carried by the shutter against which the trigger arm latch may move, said notch constituting a second latching element, a manually settable member, a second guide carried thereby, a hook carried by the settable member, a motor for moving the settable member, the manually settable member having a normal position of rest in which said second guide is adapted to hold the trigger lever out of contact with the shutter guide and latch whereby an exposure may be made by manually depressing the trigger.

4. In a photographic shutter, the combination with shutter mechanism including a master member, shutter blades, operable connections between the blades and master member, a trigger for releasing the master member to make an exposure, a lever attached to the trigger forming a first latch element, a notched guiding rail carried by the shutter, said notch constituting a second latching element, a spring pressing said shutter lever against said rail and toward said second latching element, a manually settable member, a second guide carried thereby, a hook carried by the settable member, a motor for moving the settable member, the manually moving the settable member, the manually settable member having a normal position of rest in which said second guide is adapted to hold the trigger lever out of contact with the shutter guide and latch whereby an exposure may be made by manually depressing the trigger.

5. In a photographic shutter, the combination with shutter mechanism including a master member, shutter blades, operable connections between the blades and master member, a trigger for releasing the master member to make an exposure, a lever attached to the trigger forming a first latch element, a pivot forming the attaching means on which the lever may swing relative to the trigger, a spring tending to move the arm in one direction, a notched guide rail carried by the shutter against which the arm is moved by the spring, said notch constituting a second latch element positioned to limit the movement of the trigger, a manually settable member, a second guide carried thereby, a hook carried by the settable member, a motor for moving the settable member, the manually settable member having a normal position of rest in which said second guide is adapted to hold the trigger lever out of contact with the shutter guide and latch whereby an exposure may be made by manually depressing the trigger.

6. In a photographic shutter, the combination with shutter mechanism including a master member, shutter blades, operable connections between the blades and master member, a trigger for releasing the master member to make an exposure, a lever attached to the trigger forming a first latch element adapted to latch the trigger and move it when in predetermined positions, a notched guide rail forming a second latch element adapted to engage the first latch element to hold the trigger in a predetermined position, movable spring-driven means for guiding the lever arm for holding the two latch elements away from an operative latching position when said movable means is in a normal position of rest, a handle for setting the movable means to tension said spring and move said means to an operative position, and a hook carried by said movable means for engaging and moving the first latch element and trigger whereby said trigger may be operated by the spring-driven settable moving means after said means has released said latched trigger.

7. In a photographic shutter, the combination with shutter mechanism including a master member, shutter blades, operable connections between the blades and master member, a trigger for releasing the master member to make an exposure, a lever attached to the trigger forming a first latch element and adapted to latch the trigger and move it when in predetermined positions, a slanting notched guide rail for guiding the lever arm, said notch therein constituting a second latch element, an oscillatable member spring held in one position and settable to place the spring under tension to oscillate, a guide and hook carried by said oscillatable member adapted to be moved through a curved path thereby, a spring drive and setting arm for said oscillatable member adapted to engage the trigger arm to unlatch the same, said hook in moving through its curved path under the impulse of the motor being adapted to engage the first latch for operating the trigger and, as it moves through its curved path, slip off the first latch as the trigger arm is guided along the slanting guide rail.

8. In a shutter, the combination with a master member, of a lever for setting the master member, a trigger for releasing the master member, shutter blades, operable connections between the shutter blades and master member for making an exposure upon operation of the trigger, power-operated means for operating said trigger after a time interval, a gear train for controlling the time interval, a setting lever for tensioning the power-operated means, and a latch under control of said master member and adapted to engage the setting lever of the power means, whereby the latter may only be operated to move the shutter trigger when the former is in a predetermined position.

9. In a shutter, the combination with a master member, of a lever for setting the master member, a trigger for releasing the master member, shutter blades, operable connections between the shutter blades and master member for making an exposure upon operation of the trigger, power-operated means for operating said trigger after a time interval, a gear train for controlling the time interval, a setting lever for tensioning the power-operated means, and a latch spring pressed into latching engagement with the power-operated means setting lever normally holding said lever against movement, said latch being engageable by said master member when moved by said master member setting lever into position to make an exposure, thereby releasing said latch.

10. In a shutter, the combination with a master member, of a lever for setting the master member, a trigger for releasing the master member, shutter blades, operable connections between the shutter blades and master member for making an exposure upon operation of the trigger, power-operated means for operating said trigger after a time interval comprising an oscillatable ring, a gear train for retarding movement of the ring, a lever for setting the ring and a pivoted latch carried by the shutter having two arms, one arm including a latch element adapted to engage and hold a latch element carried by the ring and the other arm lying adjacent and being adapted to engage the master member when in a predetermined position, whereby when said setting lever for the master member is moved to move the latter, said latch may be swung upon its pivot to release the oscillatable ring.

11. In a shutter, the combination with a master member, of a lever for setting the master member, a trigger for releasing the master member, shutter blades, operable connections between the shutter blades and master member for making an exposure upon operation of the trigger, power-operated means for operating said trigger after a time interval comprising an oscillatable ring, a gear train for retarding movement of the ring, a lever for setting the ring and a pivoted latch carried by the shutter having two arms, one arm including a latch element adapted to engage and hold a latch element carried by the ring and the other arm lying adjacent and being adapted to engage the master member when in a predetermined position, whereby when said setting lever for the master member is moved to move the latter, said latch may be swung upon its pivot to release the oscillatable ring, a lever pivoted to the trigger, operable connections between the ring and lever for operating the trigger from the oscillatable ring when unlatched by the master member.

12. In a shutter, the combination with a master member, of a lever for setting the master member, shutter leaves, operable connections between the shutter leaves and master member, a trigger for releasing the set master member to operate the leaves making an exposure, a secondary trigger operating means comprising a spring operated gear train, means for temporarily latching the secondary trigger operating means to the trigger comprising a latch element carried thereby and an arm attached to the trigger and including a latch element and means preventing the trigger arm latch and the secondary trigger operating means latch from engaging comprising a guide on the secondary trigger operating means and a lever for setting the spring operated gear train and simultaneously moving the guide to an inoperative position whereby the latch may engage and move the trigger arm latch as said secondary trigger operating means moves under the impulse of its spring.

WILLIAM A. RIDDELL.